US011953368B2

(12) United States Patent
Masotti et al.

(10) Patent No.: US 11,953,368 B2
(45) Date of Patent: Apr. 9, 2024

(54) WEIGHING SYSTEM FOR A CAPSULE FILLING MACHINE

(71) Applicant: I.M.A. INDUSTRIA MACCHINE AUTOMATICHE S.P.A., Ozzano dell'Emilia (IT)

(72) Inventors: Alessandro Masotti, Ozzano dell'Emilia (IT); Massimo Ribani, Ozzano dell'Emilia (IT); Maurizio Bedetti, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 371 days.

(21) Appl. No.: 17/605,340

(22) PCT Filed: May 13, 2020

(86) PCT No.: PCT/IB2020/054530
§ 371 (c)(1),
(2) Date: Oct. 21, 2021

(87) PCT Pub. No.: WO2020/230052
PCT Pub. Date: Nov. 19, 2020

(65) Prior Publication Data
US 2022/0228903 A1    Jul. 21, 2022

(30) Foreign Application Priority Data
May 15, 2019    (IT) .................. 102019000006838

(51) Int. Cl.
*G01G 17/04*    (2006.01)
*A61J 3/07*    (2006.01)
*B65B 1/06*    (2006.01)

(52) U.S. Cl.
CPC .............. *G01G 17/04* (2013.01); *A61J 3/074* (2013.01); *B65B 1/06* (2013.01)

(58) Field of Classification Search
CPC ......... A61J 3/074; A61J 2200/74; B65B 1/06; B65B 1/32; G01G 17/04
(Continued)

(56) References Cited

U.S. PATENT DOCUMENTS 6,114,636 A    9/2000 Cane' et al.
8,426,753 B2    4/2013 Birrer et al.
(Continued)

FOREIGN PATENT DOCUMENTS

CN    1200807    12/1998
CN    101963524    2/2011
(Continued)

OTHER PUBLICATIONS

International Search Report dated Sep. 10, 2020 in International (PCT) Application No. PCT/IB2020/054530.

*Primary Examiner* — Timothy L Maust
(74) *Attorney, Agent, or Firm* — Wenderoth, Lind & Ponack, L.L.P.

(57) ABSTRACT

A weighing system fills capsules with a product, each capsule having a body. The weighing system includes a weighing unit with a weighing cell and a gripping element connected to the weighing cell by means of a loading stem and provided with a housing for receiving and/or retaining a capsule or body to be weighed. The weighing system also includes a connecting element rigidly fixed to the loading stem and slidably and elastically supporting the gripping element that is movable between a measuring position, wherein the gripping element is completely supported by the loading stem and spaced from an abutment wall of the weighing unit by an elastic element, and an end-stroke (Continued)

position reached by contrasting the thrust of the elastic element, wherein the gripping element abuts the abutment wall.

15 Claims, 5 Drawing Sheets

(58) Field of Classification Search
USPC .................................................. 141/144–148
See application file for complete search history.

(56) References Cited

U.S. PATENT DOCUMENTS

| | | |
|---|---|---|
| 9,021,772 B2 | 5/2015 | Bedetti |
| 9,486,106 B2 | 11/2016 | Etter |
| 10,139,266 B2 | 11/2018 | Scheu et al. |
| 10,448,780 B2 | 10/2019 | Ryser et al. |
| 11,376,196 B2 * | 7/2022 | Ribani ................... A61J 3/074 |
| 2021/0177700 A1 | 6/2021 | Ribani et al. |

FOREIGN PATENT DOCUMENTS

| | | |
|---|---|---|
| CN | 102227201 | 10/2011 |
| CN | 103124509 | 5/2013 |
| CN | 205484293 | 8/2016 |
| CN | 106132254 | 11/2016 |
| CN | 107014469 | 8/2017 |
| CN | 107621301 | 1/2018 |
| JP | 57-94626 | 6/1982 |
| WO | 2019/087066 | 5/2019 |

* cited by examiner

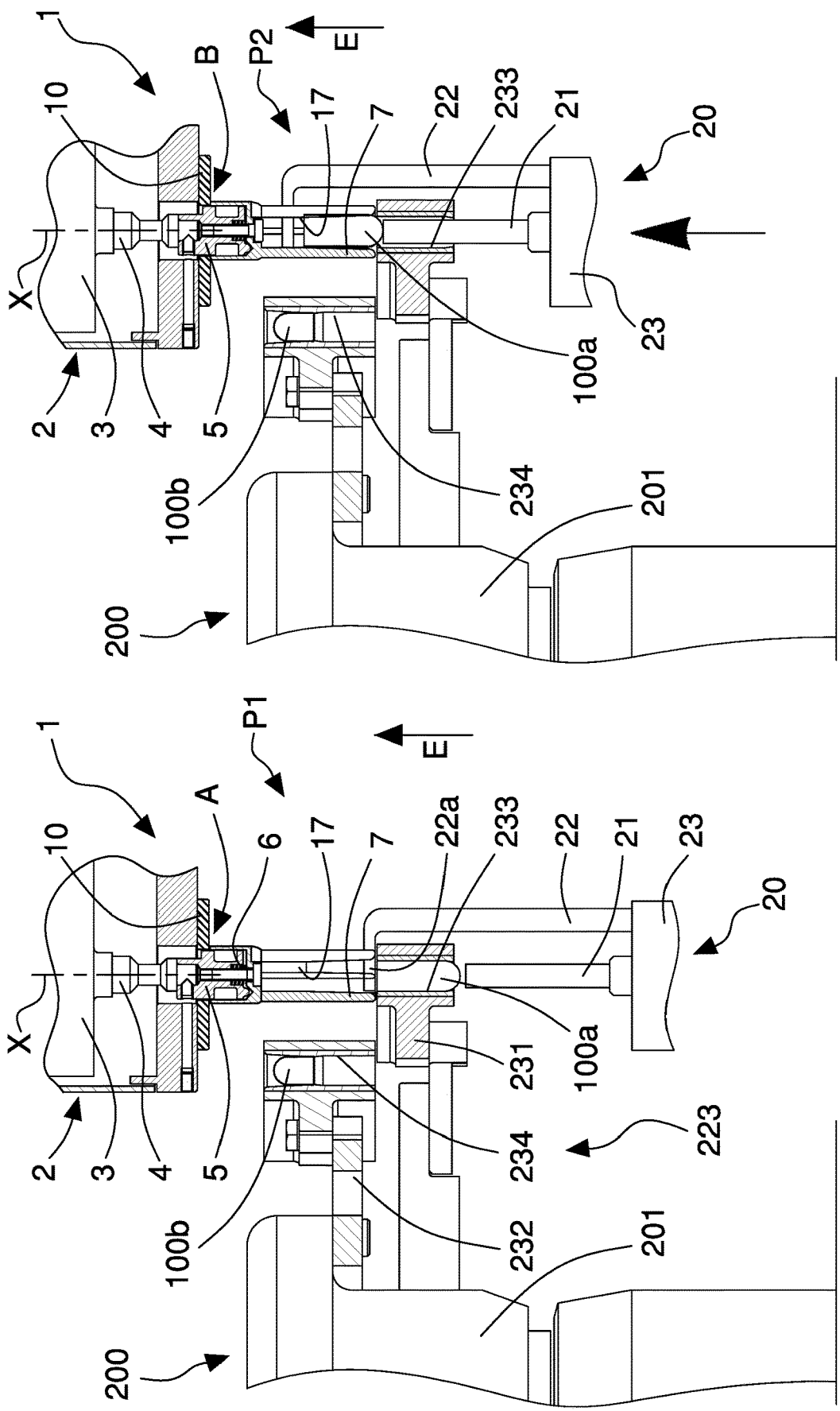

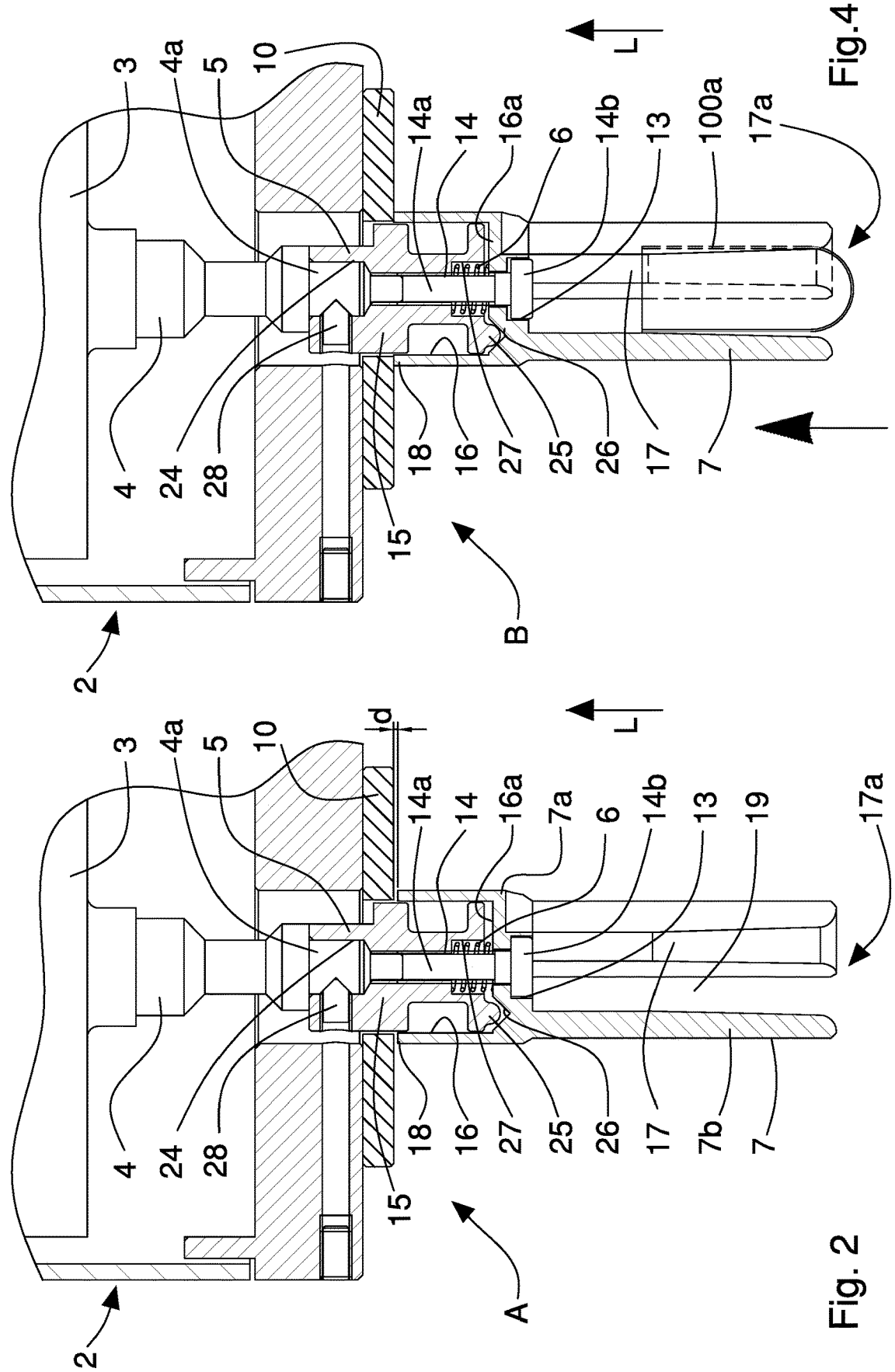

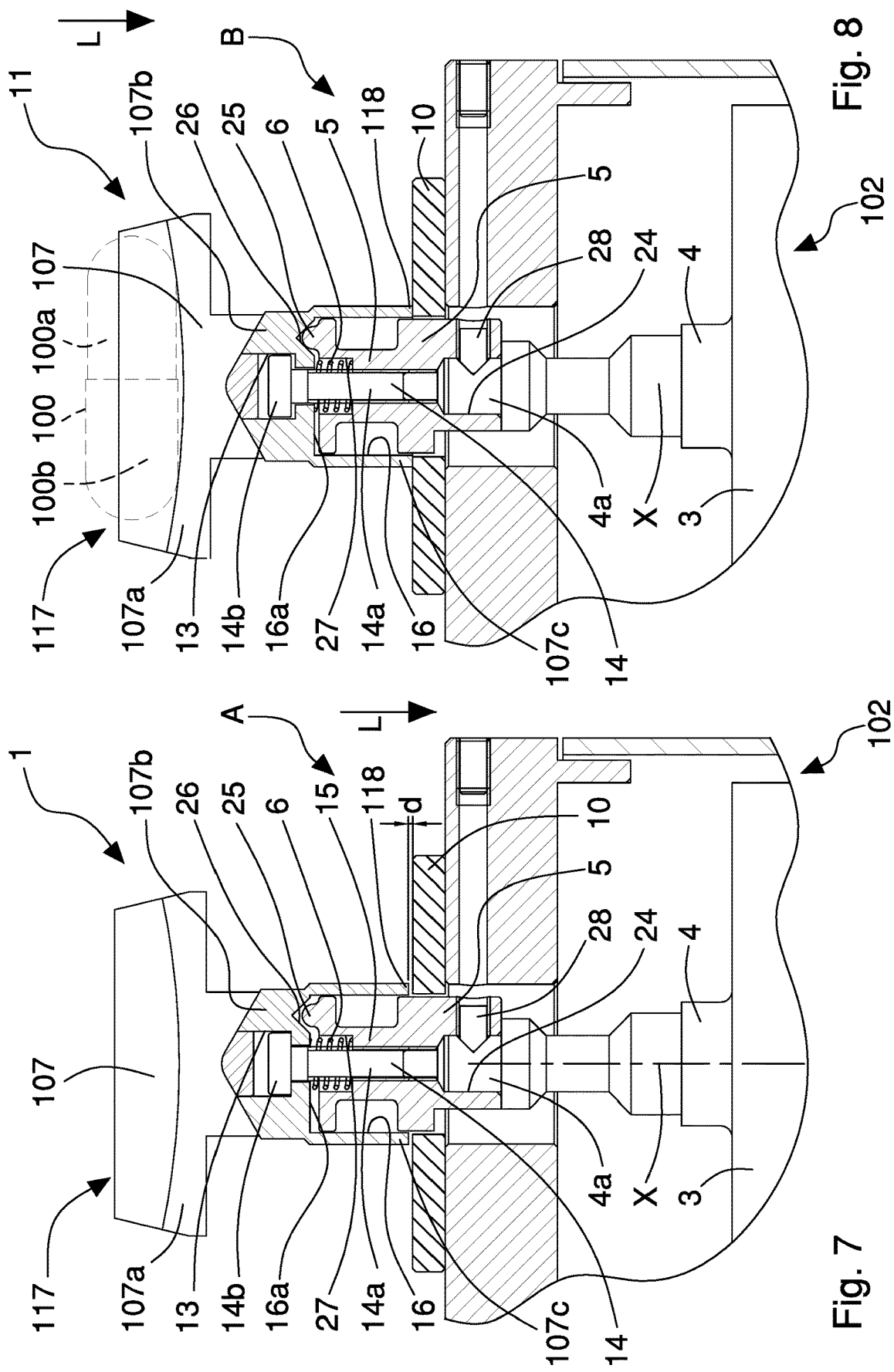

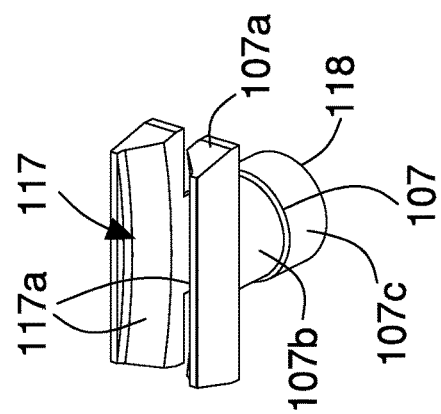
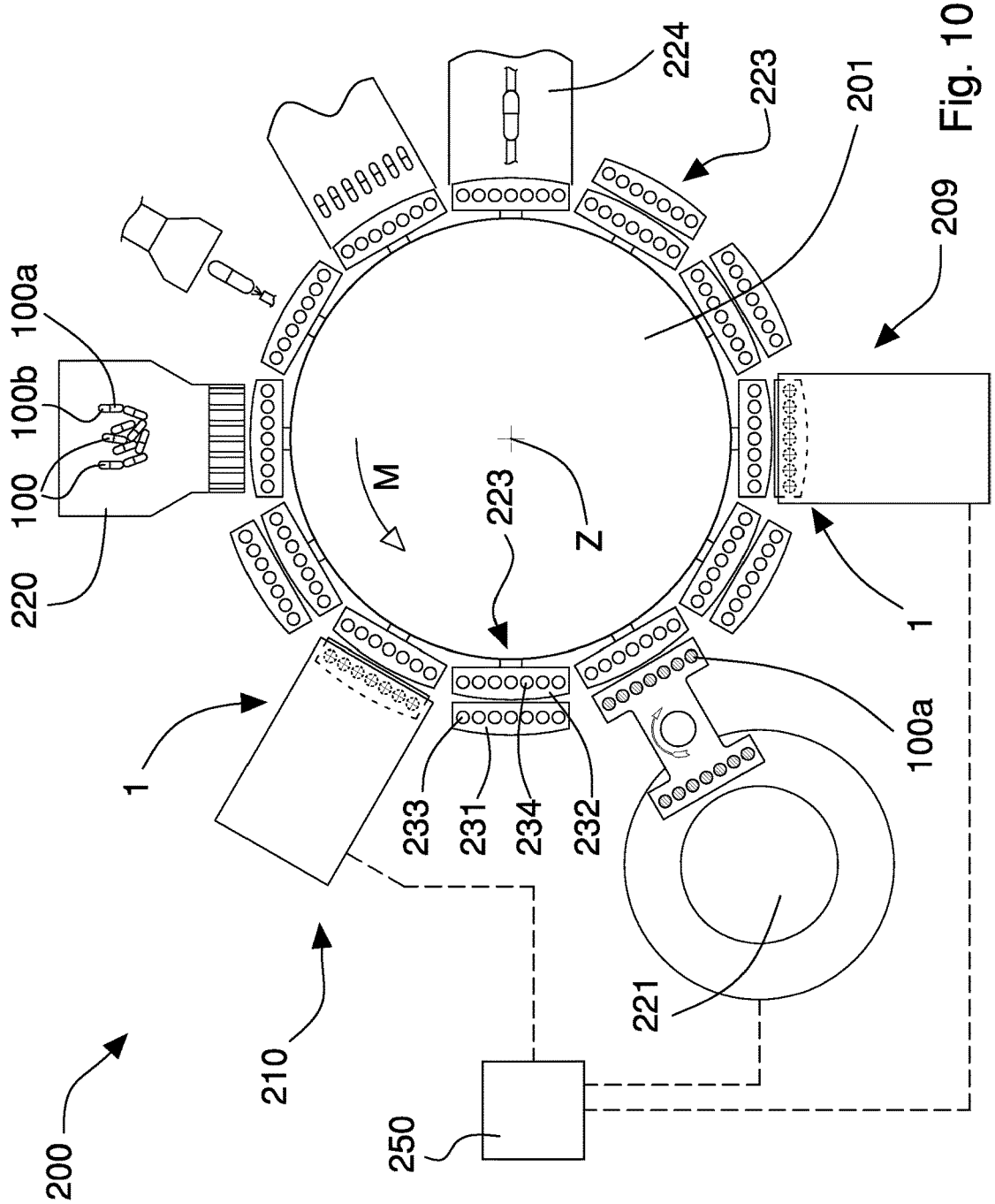

WEIGHING SYSTEM FOR A CAPSULE FILLING MACHINE

The present invention relates to apparatuses and systems for weighing items, in particular capsules, shells, tablets or similar elements in process machines. In particular, the invention relates to a weighing system that can be associated with a capsule filling machine to measure the weight of the capsules, and more precisely of the product or products dosed in the capsules.

In the filling processes of capsules with liquids, powders, granules, cronoids, tablets, etc., the use of weighing systems positioned downstream of a filling station of the filling machine in order to measure the weight of the product dosed in the capsules is known. The capsules, which are typically made of hard gelatin, HPMC, polymers, etc. are, as known, formed by a body and a cap which can be temporarily decoupled and separated to allow one or more products to be dosed into the body.

Weight control is necessary to reject non-compliant capsules from the production because they contain a quantity of product outside the allowed dosage tolerance range and to correct possible excesses or defects in the product dosage, by acting in feedback on the filling station. In fact, especially in the pharmaceutical field it is very important to verify that the quantity of product dosed in the individual capsules is exactly the required one, with very narrow tolerance ranges.

Generally capsules are only weighed once at the end of the dosing, since the weight of the empty capsules is known and included within a defined tolerance range, indicated and guaranteed by the suppliers/producers of the capsules. In this way, by subtracting the known weight of the empty capsule (tare) from the measurement of the weight of the filled capsule (gross weight) it is possible to calculate the weight of the dosed product (net weight) with a certain degree of precision.

However, in filling processes in which the quantity of product to be dosed in the capsules is very small, for example a few milligrams (so-called "micro-doses"), and the tolerance range required for the dosage of the product is limited, for example ±10%, the normal weight variations of the empty capsules strongly influence and affect the weight measurement. Indeed, since the weight of the empty capsules is comparable to that of the dosed product, these empty capsule weight variations can be larger than the tolerance range of the allowed dosage. In this case, checking only the weight of the filled capsule is insufficient for guaranteeing that the quantity of dosed product is within the required limits and it is necessary to weigh the empty capsule beforehand and calculate the difference in weight of the dosed product.

Solutions are therefore known which provide a first weighing station, upstream of the filling machine or of the filling station, which measures the weight of the capsules or of the empty bodies (tare), and a second weighing station, downstream of the filling station, which measures the weight of the capsules or bodies filled with the product (gross weight). The difference of the two measured weights allows precisely calculating the net weight of the dosed product.

The weighing apparatuses that perform this type of direct measurement include electronic scales typically equipped with a plurality of weighing cells, or load cells, each of which is equipped with a respective support (plate) on which the capsule or body can be positioned for the time necessary for the correct measurement.

The weight check can be of the total type, i.e. performed on all the filled capsules in the filling station (so-called 100% weight control) or a partial, statistical type check carried out on a sample of filled capsules.

In certain types of pharmaceutical production, however, the control of all the filled capsules is required and in general this solution is widely preferred by pharmaceutical companies in order to guarantee a better quality of the packaged product.

Suitable transfer means are provided for taking the capsules from a transport device of the filling machine and positioning them on the supports of the load cells and then for returning the capsules to the transport device after their weighing. The weighing procedure—which comprises the transfer of the capsule from the transport device to the load cell, its weighing on the latter and its transfer from the load cell to the transport device—is carried out in one of the pause intervals of the intermittent motion with which the filling machine moves.

It is known that to perform an accurate and precise weighing using scales with electronic load cells, an adequate measurement time is necessary. In particular, between the deposition of the capsule on the load cell support and the measurement of its weight, a minimum interval of time must elapse, necessary to allow the load cell to stabilize or to allow the damping of the vibrations that are generated by resting the capsule on the support and to proceed with the weight detection.

To ensure an adequate amount of time for measuring the weight of the capsules, the movements for transferring the capsules are performed by the transfer means as quickly as possible.

It has been found, however, that such movements, in particular the deposition and/or insertion of the capsules on the supports, can generate anomalous mechanical stresses on the supports themselves and therefore on the relative load cells, which can lead to malfunctions and even breakages of one or more of the load cells, this requiring the replacement of the scales as well as the stopping of the filling machine and therefore of production. In particular, the insertion movement of the capsule on the support can cause an excessive stroke of the load cell support and/or axial thrusts which can alter the calibration of the load cell or even damage the load cell.

An object of the present invention is to improve the known weighing systems provided with electronic scales with load cells and associable with capsule filling machines for measuring the weight of the capsules and, in particular of the product(s) dosed in the capsules.

Another object is to provide a weighing system that allows operating at high speeds while preserving the integrity and functionality of the load cells of the scales, i.e. avoiding excessive mechanical stresses on the load cells.

A further object is to provide a weighing system which allows measuring the weight of all the filled capsules, even at high operating speeds of the filling machine.

Still another object is to provide a weighing system which is particularly compact and of limited dimensions and has reliable and safe operation.

These objects and others are achieved by a weighing system according to one of the claims set forth below.

The invention can be better understood and implemented with reference to the attached drawings which illustrate some exemplifying and non-limiting embodiments thereof, wherein:

FIG. 1 is a partially sectioned schematic view of a weighing system according to the invention associated with a capsule filling machine, partially shown, in a first operating step of a weighing process;

FIG. 2 is an enlarged partial view of the weighing system of FIG. 1;

FIG. 3 is a partially sectioned schematic view of the weighing system of the invention in a second operating step;

FIG. 4 is an enlarged partial view of the weighing system of FIG. 3;

FIG. 7 is an enlarged, partial and partially sectioned view of a variant of the weighing system of the invention in a non-operating step;

FIG. 8 is a view similar to that of FIG. 7 which shows the weighing system in a weighing operating step;

FIG. 9 is an enlarged perspective view of a capsule gripping element of the weighing system of FIG. 7;

FIG. 10 is a schematic plan view of a capsule filling machine comprising a pair of weighing systems according to the invention.

Figure 6:
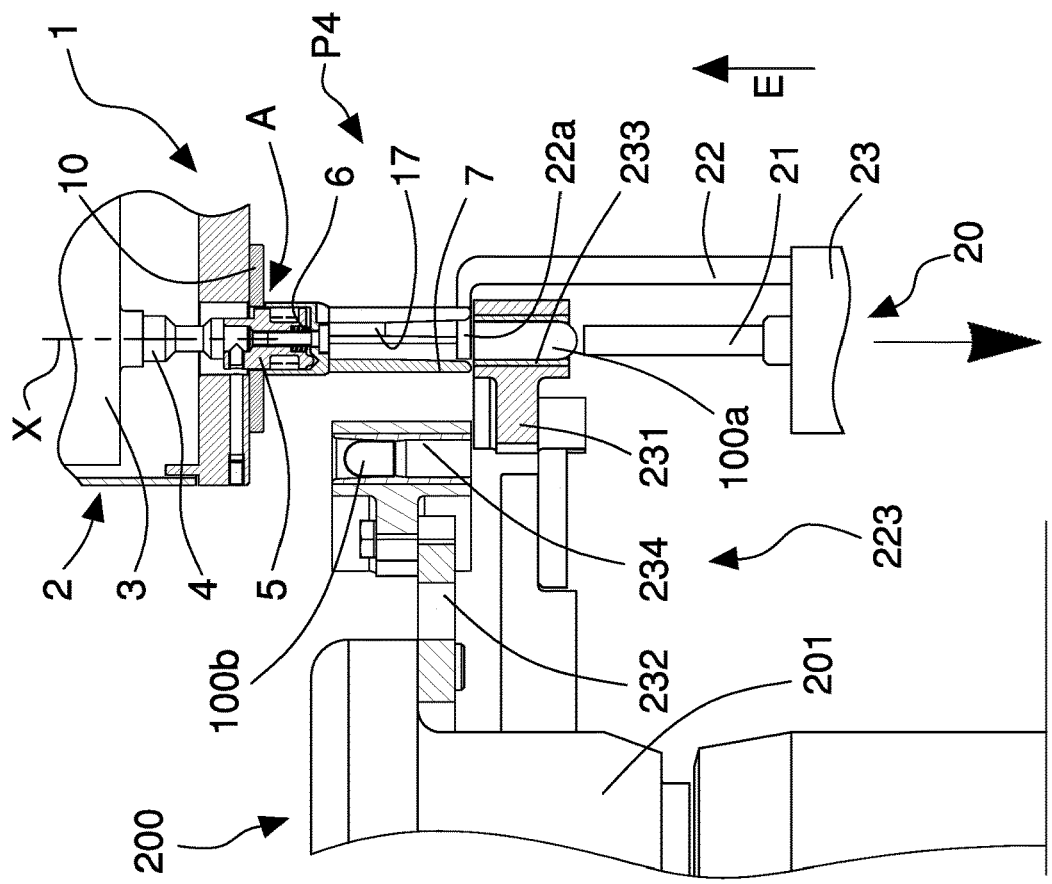
FIG. 6 is a partially sectioned schematic view of the weighing system of the invention in a fourth operating step.
Figure 5:
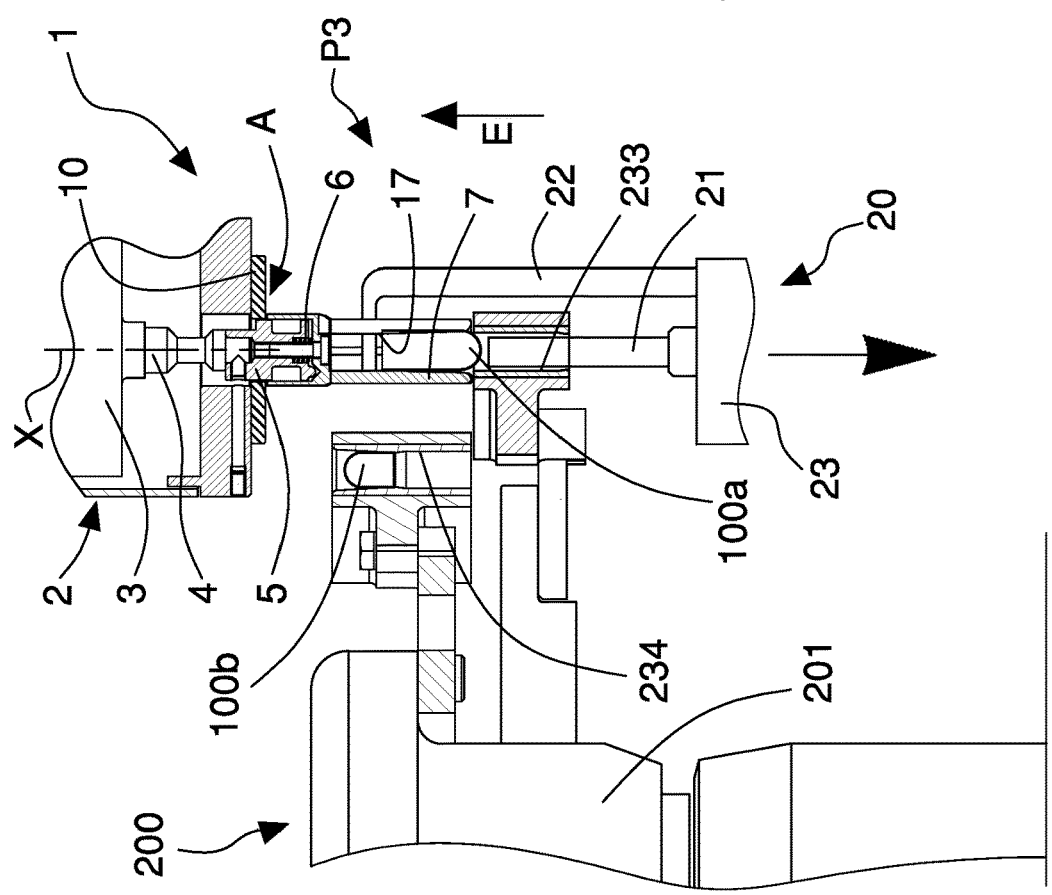
FIG. 5 is a partially sectioned schematic view of the weighing system of the invention in a third operating step.

With reference to FIGS. 1 to 6, the weighing system 1 of the invention is illustrated, which can be associated with a filling machine 200 arranged to fill capsules 100 or similar elements with at least one product in liquid, powder, granule, cronoid, tablet form, etc., in particular a pharmaceutical product. Each capsule 100 is made of hard gelatin and is formed by a body 100a and a cap 100b which can be temporarily decoupled and separated to allow one or more products to be dosed in the body 100a.

The weighing system 1 comprising a weighing unit 2 which includes at least one scale provided with at least one weighing cell or load cell 3, in particular of electronic type, and with a respective gripping element 7 connected to the weighing cell 3 through a loading stem 4 and equipped at one end with a housing 17 arranged to receive and retain a capsule 100 or a body 100a to be weighed. In particular, in the embodiment described and illustrated in the figures by way of non-limiting example, the weighing unit 2 is arranged to weigh the bodies 100a of the capsules 100, but the structure and the operation of the weighing system 1 of the invention described below are the same also in the case of weighing whole capsules 100.

The weighing system 1 also comprises a connecting element 5 rigidly fixed to the corresponding loading stem 4 of the weighing cell 3 and slidably and elastically supporting, through the interposition of elastic means 6, the gripping element 7. The gripping element 7 can be moved linearly, in particular along a direction of movement L, between a measuring position A and an end-stroke position B. In the measuring position A the gripping element 7 is completely supported by the loading stem 4 and thus by the weighing cell 3, spaced by means of the elastic means 6 from an abutment wall 10 of the weighing unit 2, so as not to abut the latter, in particular to allow weighing a body 100a (or a capsule 100) supported by the same gripping element 7. In the end-stroke position B that is reached by a movement of the gripping element 7 with respect to the connecting element 5 which counteracts a thrust of the elastic means 6, the gripping element 7 abuts the abutment wall 10.

It should be noted that the elastic means 6 are configured, in particular sized, so that a displacement d of the gripping element 7 between the measuring position A and the end-stroke position B (stroke of the gripping element 7)—thanks to the aforesaid elastic means 6 which are compressed—is carried out so as not to cause any displacement of the loading stem 4 of the weighing cell 3 so as to preserve the integrity and functionality of the weighing cell 3, as better explained in the following description.

For this purpose, the gripping element 7 comprises an abutment end 18 opposite the housing 17 and arranged facing the abutment wall 10 of the weighing unit 2 so as to abut the latter.

The gripping element 7 also comprises a connecting cavity 16 opposite the housing 17 and arranged to receive a coupling portion 15 of the connecting element 5, with the elastic means 6 which are interposed between the aforementioned coupling portion 15 and a bottom wall 16a of the connecting cavity 16.

In the embodiment illustrated in FIGS. 1 to 6, the gripping element 7 has a substantially cylindrical shape and comprises an upper part 7a in which the connecting cavity 16 is realized and which includes the abutment end 18, and a lower part 7b in which the housing 17 is realized.

With particular reference to FIG. 2, the connecting cavity 16 has a substantially cylindrical shape so as to receive with small clearance the coupling portion 15 of the connecting element 5, also substantially cylindrical and provided with an annular lightening groove. The gripping element 7 is connected to the connecting element 5 by means of a fixing element 14, for example a screw, which also supports and guides the elastic means 6, the latter comprising for example a helical spring acting in compression. In particular, the fixing element 14 passes through the elastic means 6 or, in other words, the helical spring 6 is mounted on the screw 14 and interposed between the bottom wall 16a of the connecting cavity 16 and a compartment 27 provided in the coupling portion 15.

The screw 14 is fixed to the coupling portion 15 of the connecting element 5 and is slidably connected to the gripping element 7. More precisely, a threaded stem 14a of the screw 14 is screwed to the coupling portion 15, while its head 14b is housed in a first seat 13 of the gripping element 7.

In the measuring position A, the helical spring 6 acting on the bottom wall 16a of the connecting cavity 16 keeps the abutment end 18 detached and spaced from the abutment wall 10 by a distance corresponding to the displacement (stroke) d that the gripping element 7 can carry out between the measuring position A and the end-stroke position B. This distance can be adjusted by suitably acting on the screw 14 screwed to the connecting element 5.

In the end-stroke position B, the helical spring 6 is compressed and the gripping element 7, counteracting the thrust of the helical spring 6, abuts the abutment wall 10. Since the displacement d of the gripping element 7 between the weighing position A and the end-stroke position B does not cause, due to the presence of the helical spring 6 which is compressed, a displacement of the loading stem 4 of the weighing cell 3, the latter does not remain damaged or altered by the insertion of the body 100a in the gripping element 7 regardless of an (also high) insertion speed.

The coupling portion 15 also comprises at least one centring protrusion 25 arranged to couple with second seat 26 having a substantially complementary shape and carried out on the bottom wall 16a of the connecting cavity 16; the shape coupling between the centring protrusion 25 and the second seat 26 substantially prevents, in operation, a relative rotation of the gripping element 7 with respect to the connecting element 5 about a longitudinal axis substantially coinciding with a longitudinal axis X of the loading stem 4. The latter comprises a connection end 4a inserted and locked with a transverse fixing dowel 28 in a further connecting cavity 24 realized at one end of the connecting element 5 opposite the coupling portion 15.

In the embodiment illustrated in FIGS. 1 to 6, the weighing system 1 of the invention further comprises transfer means 20 arranged to transfer the capsules 100 or the bodies 100a from a moving device 201 of the filling machine 200 to a gripping element 7 and vice versa, i.e. from a gripping element 7 towards a moving device 201 of the filling machine 200. The housing 17 of the gripping element 7 is configured to receive and retain the respective body 100a to be weighed through force or interference coupling.

As better explained in the description that follows, the transfer means 20 by transferring or pushing the capsule 100 or the body 100a into the gripping element 7 moves the latter to the end-stroke position B. In other words, the transfer means 20 pushes the gripping element 7 to the end-stroke position B by means of or through the capsule 100 or the body 100a.

The moving device 201 comprises, for example, a plurality of supports 223 with respective seats 233, 234 for housing and moving the bodies 100a and caps 100b of the capsules 100 in sequence through the various operating stations of the filling machine. For example, the moving device 201, of a known type, comprises a carousel or table, rotatable about a vertical rotation axis and provided with a plurality of supports 223, arranged angularly spaced along the periphery or a circumferential edge of the aforementioned carousel. Each support 223 is formed by a first support element 231, having a plurality of first seats 233, intended to house the bodies 100a of the capsules 100 and a second support element 232, having a plurality of second seats 234 intended to house the caps 100b of the capsules 100. The support elements 231, 232 have an elongated shape and are movable with respect to one another between an overlapping position in which the respective seats 233, 234 are aligned and overlapped for insertion or removal of the entire capsules 100 (i.e. with the caps 100b applied to the respective bodies 100a) and an offset position in which the first seats 233 containing the bodies 100a are accessible to allow the dosing of the product.

The transfer means 20 is movable along an insertion/extraction direction E, in particular substantially vertical, and comprises a first transfer element 21 and a second transfer element 22. The first transfer element 21 is arranged to insert the body 100a in the housing 17 so as to allow the weighing cell 3 to measure the weight of the body; the second transfer element 22 is arranged to remove the body 100a from the housing 17 after measuring the weight of the body.

More precisely, the first transfer element 21 is arranged to remove a body 100a from a respective first seat 233 of the moving device 201 and then insert it in the housing 17 of the gripping element 7, while the second transfer element 22 is arranged to remove the body 100a from the housing 17 and insert this body 100a in the respective first seat 233 of the moving device 201, once the weight has been measured.

The first transfer element 21 and the second transfer element 22 are movable along the insertion/extraction direction E, in particular substantially vertical, between a first operating position P1, a second operating position P2, a third operating position P3 and a fourth operating position P4.

In the first operating position P1 the transfer elements 21, 22 are more spaced from the loading stem 4, in particular in a distal position, in particular disengaged and spaced from the body 100a, housed in the respective first seat 233 of the moving device 201, so as not to interfere with the movement of the latter. In the second operating position P2, the transfer elements 21, 22 are closer to the loading stem 4, in particular in a proximal position, so as to insert the body 100a inside the housing 17 of the gripping element 17, in particular after the first transfer element 21 has completely extracted the body 100a from the respective first seat 233 of the moving device 201. In the third operating position P3 the transfer elements 21, 22 are spaced from the loading stem 4 in an intermediate position between the first operating position P1 and the second operating position P2 not in contact with the body 100a that is housed and retained by force or interference coupling in the housing 17, so as to allow the weighing cell 3 to measure the weight of the body 100a. In the fourth operating position P4 the second transfer element 22 has completely extracted the body 100a from the housing 17 of the gripping element 7 and inserted it inside the respective first seat 233 of the moving device 201.

It should be noted that, in the second operating position P2 of the transfer elements 21, 22, the gripping element 7 is pushed—by means of the action of the body 100a in turn pushed by the first transfer element 21 inside the housing 17 and blocked therein by interference—in the end-stroke position B in which it abuts the abutment wall 10. In this way, the mechanical stresses (axial thrusts) transmitted to the gripping element 7 by the first transfer element 21, movable along the insertion/extraction direction E, are not transferred and unloaded on the weighing cell 3, but on the abutment wall 10 of an external casing of the weighing unit 2.

In the third operating position P3 of the transfer elements 21, 22 which are disengaged and spaced from the body 100a and therefore also disengaged from the gripping element 7, the latter—no longer pushed by the first transfer element 21 through the body 100a—can be returned to the weighing position A by the helical spring 6 so as to be spaced from the abutment wall 10 and be completely supported by the loading stem 4 of the weighing cell 3 which can accurately and precisely weigh, without interference, the body 100a inserted in the housing 17.

In the embodiment of the weighing system 1 of the invention illustrated in FIGS. 1 to 6, the weighing unit 2 with the gripping element 7 is arranged above the moving device 201, in particular with the gripping element 7 extending vertically downwards and towards the moving device 201. The housing 17 of the gripping element 7 has an inlet end 17a which allows the transfer means 20 to insert/extract the body 100a in/from said housing 17 along the insertion/extraction direction E. The inlet end 17a of the housing 17 has a bevelled or rounded edge to facilitate the insertion of the body 100a.

The first transfer element 21 has an elongated shape and is arranged to enter, when moved along the insertion/extraction direction E, inside a respective first seat 233 of the moving device 201 to abut, in the illustrated embodiment, a lower portion of a body 100a and push the latter out of the first seat 233 and inside the housing 17. The first transfer element 21 is inserted into the first seat 233 through an inlet end thereof so as to abut and push the body 100a to exit the first seat 233 through an opposite upper opening thereof. The second transfer element 22 also has an elongated shape and has at least one end portion 22a adapted to abut an upper portion of the body 100a to push the latter out of the housing 17 and inside the first seat 233. More specifically, the second transfer element 22 substantially has an inverted "L" shape and comprises a first elongated portion, parallel to the insertion/extraction direction E and a second portion orthogonal to the insertion/extraction direction E which forms the end portion 22a.

The first transfer element 21 and the second transfer element 22 are fixed to a base element 23 of the transfer means 20 which is moved by actuation means, of known type and not shown in the figures, along the insertion/extraction direction E, between the different operating positions P1, P2, P3, P4.

The gripping element 7 has one or more lateral openings 19, in particular parallel to the insertion/extraction direction E, which allow the insertion and sliding of the second transfer element 22, in particular the end portion 22a thereof, inside the housing 17 and along the insertion/extraction direction E.

The housing 17 extends longitudinally, in particular parallel to the insertion/extraction direction E, and has an extension such as to contain the body 100a or the capsule 100. The housing 17 is also convergent or tapered starting from the inlet end 17a towards the weighing cell 3 since the transverse section of the housing 17 (almost orthogonal to a longitudinal axis of the gripping element 7 which is parallel to the insertion/extraction direction E) progressively decreases starting from the inlet end 17a down to a size smaller than a transverse dimension of the body 100a or the capsule 100. In this way, the housing 17 is able to receive and, upon completed insertion, retain the body 100a by force or interference coupling. More precisely, the body 100a can be inserted and progressively forced into the housing 17 in which it remains reversibly locked by virtue of the elasticity of the material (gelatin) with which it is made and its hollow shape.

In the illustrated example, the capsule 100, the body 100a and the cap 100b have a hollow cylindrical shape (the body 100a and the cap 100b are also provided with respective spherical bottoms) and the housing 17 has a truncated conical shape, converging in the direction of the weighing cell 3 and with a transverse section, in particular internal, which is circular.

The weighing system 1 of the invention can include a weighing unit 2 having a plurality of gripping elements 7, in a number equal to the number of the seats 233, 234 of each support 223 of the moving device 201, and an equal number of weighing cells 3. In this way, all the bodies 100a housed in the first seats 233 of a first support element 231 of a support 223 can be weighed at the same time by the weighing unit 2. Likewise, the transfer means 20 comprise a plurality of first transfer elements 21 and a respective plurality of second transfer elements 22, in a number equal to the number of the seats 233, 234 of each support 223 of the moving device 201, so as to simultaneously transfer all the bodies 100a housed in the first seats 233 in the housings 17 of the gripping elements 7 and vice versa.

With particular reference to FIGS. 1 to 6, during the operation of the weighing system 1 of the invention associated with the filling machine 200, in particular with a weighing station thereof, in one of the pause steps of the intermittent motion with which the moving device 201 of the filling machine 200 moves, the transfer means 20 transfers the empty bodies 100a, contained in the seats 233 of the first support element 231 of a support 223, into the respective gripping elements 7 of the weighing unit 2. More precisely, the first transfer elements 21 of the transfer means 20 are moved, together with the second transfer elements 22, from the first operating position P1 (FIG. 1) to the second operating position P2 (FIG. 3) so as to remove the bodies 100a from the respective first seats 233 and insert them, by force, into the respective housings 17 of the gripping elements 7.

In the upwards movement along the insertion/extraction direction E, in the second operating position P2, each gripping element 7, which is slidably and elastically connected to the loading stem 4 of the respective weighing cell 3 by means of the interposed corresponding connecting element 5, is arranged in the end-stroke position B in which its abutment end 18 abuts the abutment wall 10 of the weighing unit 2. In this way, the mechanical stresses (axial thrusts) transmitted on the gripping element 7 by the first transfer element 21, which by force inserts and locks the body 100a into the housing 17, are not transferred and unloaded on the weighing cell 3, but on the abutment wall 10. It should be noted that the displacement d of the gripping element 7 between the measuring position A and the end-stroke position B thanks to the elastic means 6 (suitably sized), which are compressed, does not cause any movement of the loading stem 4 of the weighing cell 3. Therefore, the transfer of the body 100a from the respective seat 233 to the gripping element 7 performed by the transfer means 20 does not damage or harm the regular operation of the weighing cell 3, even with high movement speeds of the first transfer element 21.

The transfer elements 21, 22 are then moved to the third operating position P3 (FIG. 5) in which they are disengaged and spaced from the body 100a housed and retained by force in the housing 17 to allow the weighing cell 3 to measure the weight thereof.

In the third operating position P3 the transfer elements 21, 22 are disengaged also from the gripping element 7 which in this way, no longer subject to any thrust by the first transfer element 21 through the body 100a, is returned to the measuring position A by means of the helical spring 6. In the measuring position A the gripping element 7 is spaced from the abutment wall 10 and completely supported by the loading stem 4 of the weighing cell 3 to allow the body 100a inserted in the housing 17 to be weighed accurately and precisely, without interference or disturbance.

Once the weight of the empty bodies 100a has been measured, the transfer elements 21, 22 are moved to the fourth operating position P4 (FIG. 6) so that the second transfer elements 22 can remove the bodies 100b from the housings 17 of the gripping elements 7 and insert them completely into the respective first seats 233 of the support 223. The operation of the weighing system 1 of the invention described above is the same also in the case of weighing whole capsules 100.

Thanks to the transfer means 20 and the gripping elements 7 which receive and retain the bodies 100a of the capsules 100, or the capsules 100, by force, it is possible to transfer the bodies 100a very quickly, easily and efficiently from/to the moving device 201 and allow precisely and accurately weighing the bodies 100a, both empty and containing the product, by means of the load cells 3 directly connected to the said gripping elements 7. The first transfer elements 21 and the second transfer elements 22 are in fact linearly moved along the insertion/extraction direction E with limited strokes, therefore executable in very short times, between the various operating positions P1-P4. Therefore, the time necessary to carry out the entire weighing operation—which comprises the transfer of the body 100a from the moving device 201 to the gripping element 7 of the weighing cell 3, its weighing on the latter and its transfer from the gripping element 7 to the moving device 201—is very short and can be equal to the duration of the pause steps of an intermittent motion of the filling machine 1 also having a high speed or productivity. It is therefore possible to perform a total weight control of all the capsules 100 without decreasing the operating speed of the filling machine, which can be very high and equal to the operating speed of the known filling machines which perform a partial weight control of statistical type or a total weight control but with reduced measurement precision and accuracy.

Furthermore, the weighing system 1 of the invention, thanks to the connecting element 5 rigidly fixed to the corresponding loading stem 4 of the weighing cell 3 and slidably and elastically supporting the gripping element 7 through the interposition of the elastic means 6, allows preserving the integrity and functionality of the weighing cell 3 during the transfer of the body 100a of the capsule 100 inside the housing 17 of the gripping element 7. In particular, the gripping element 7 can be moved elastically in the end-stroke position B in which it abuts the abutment wall 10 of the weighing unit 2 so as not to act or transfer mechanical stresses, in particular axial thrusts, to the weighing cell 3.

With reference to FIGS. 7 and 8, a variant of the weighing system 1 of the invention is illustrated, which can also be associated with a capsule filling machine 100, which differs from the embodiment described above and shown in FIGS. 1 to 6 for the shape and the position of the gripping element 107. The latter extends from the weighing unit 102 upwards and has a housing 117 configured to receive a capsule 100. More precisely, the housing 117 comprises a cavity open at the top, which extends transversely to a direction of movement L of the gripping element 107 between the measuring position A (FIG. 7) and the end-stroke position B (FIG. 8). The housing 117 is formed by a pair of opposite walls 117a converging towards the inside of the gripping element 107 and arranged to receive a capsule 100 (FIG. 9).

The capsule 100 is inserted and then extracted from the housing 117 by transfer means of the weighing system 1 or of the filling machine of known type and not illustrated and described in detail.

The gripping element 107 comprises an upper part 107a, which extends transversely and has the housing 117, a central part 107b and a lower part 107c that have a substantially cylindrical shape. The connecting cavity 16, which is arranged to receive the coupling portion 15 of the connecting element 5 with the interposition of the elastic means 6, is realized in the lower part 107c which includes the abutment end 118.

The gripping element 107 is connected to the connecting element 5 through the fixing element 14 (screw), which supports and guides the helical spring of the elastic means 6. The threaded stem 14a of the screw 14 is screwed to the coupling portion 15, while its head 14b is housed in a first seat 13 of the gripping element 107.

In the normal operation of this variant of the weighing system 1 of the invention, the capsule 100 is positioned (with an established and reduced release force) by the transfer means in the housing 117 of the gripping element 107 which is connected and supported by the loading stem 4, so as to allow the weighing cell 3 to weigh the capsule 100.

If for accidental and unforeseen causes, malfunctions, anomalies, etc. the transfer means exerts an excessive force or thrust on the gripping element 107 in releasing the capsule 100 in the housing 117, the gripping element is moved along the direction of movement L from the measuring position A to the end-stroke position B. In in this position, the helical spring 6 is compressed and the gripping element 107 abuts the abutment wall 10 of the weighing unit 102, so as not to transfer mechanical stresses, in particular axial thrusts, to the weighing cell 3.

When the capsule 100 is released by the transfer means in order to be weighed, the gripping element 7, no longer subject to excessive force or thrust, is brought back to the weighing position A by the helical spring 6 so as to be spaced from the abutment wall 10 and fully supported by the loading stem 4 of the weighing cell 3 to allow the capsule 100 inserted in the housing 117 to be weighed accurately and precisely, without interference. Also in this case, since the displacement d of the gripping element 107 between the weighing position A and the end-stroke position B—thanks to the intervention of the helical spring (suitably sized) which is compressed—does not cause a displacement of the loading stem 4 of the weighing cell 3, the latter does not remain damaged or altered by the positioning of the capsule 100 in the gripping element 107 regardless of the abnormal and high positioning speeds and forces of the transfer means.

With reference to FIG. 10, a filling machine 200 for capsules is shown which comprises a plurality of operating stations 220, 221, 224 for performing operations on the capsules 100, a moving device 201 provided with a plurality of supports 223 with respective seats 233, 234 for housing and moving the capsules 100 in sequence through the operating stations 220, 221, 224 and at least one weighing station 209 for weighing the bodies 100a of the capsules 100 and which comprises the weighing system 1 of the invention. The moving device 201 comprises a carousel rotatable about a vertical axis of rotation Z and provided with a plurality of supports 223, each of which is formed by a first support element 231, having a plurality of first seats 233, intended to house the bodies 100a of the capsules 100 and a second support element 232, having a plurality of second seats 234 intended to house the caps 100b of the capsules 100.

The plurality of operating stations comprises, for example, a filling station 221 arranged to dispense and dose a product in the bodies 100a of the capsules 100; the weighing station 209 is positioned downstream of the filling station 221, with reference to a direction of movement M of the capsules 100 in the filling machine 1, so as to measure the weight of the bodies 100a containing the product.

The filling machine 1 can also comprise an initial weighing station 210 provided with a respective weighing system 1e positioned upstream of the filling station 221, with reference to the direction of movement M, so as to measure the weight of the empty bodies 100a.

In this embodiment of the filling machine 200, a feeding and opening station 220, in which the caps 100b are removed and separated from the respective bodies 100a, is positioned upstream of the initial weighing station 210, while a capsule closing station 224, in which the caps 100b are reapplied to the respective bodies 100a so as to close the capsules 100 again, is positioned downstream of the weighing station 209.

The filling machine 1 of the invention further comprises a processing unit 250 connected to the weighing station 209 and to the initial weighing station 210 and configured to receive data relating to the measured weights and to calculate the net weight of the product dosed in each capsule 100 or respective body 100a. In the case of a non-compliant capsule or respective non-compliant body—in that it contains a quantity of product with a weight outside the allowed tolerance range—the processing unit 250 is thus able to perform self-regulation of the dosing parameters (feedback control), reject the non-compliant capsules, generate an alarm signal.

The invention claimed is:

1. A weighing system associable with a filling machine for filling capsules with at least one product, each capsule being formed by a body and a cap, comprising a weighing unit provided with at least one weighing cell and a gripping element that is connected to said weighing cell by means of a loading stem and is provided at one end with a housing arranged for receiving and/or retaining a capsule or a body to be weighed, wherein the weighing system comprises at least one connecting element rigidly fixed to said loading stem and slidably and elastically supporting said gripping element by interposition of an elastic element, said gripping element being movable linearly between a measuring position, wherein said gripping element is completely supported by said loading stem and spaced from an abutment wall of said weighing unit by means of said elastic element so as not to abut said abutment wall to allow weighing a capsule or a body, and an end-stroke position, reached with a movement of said gripping element with respect to said connecting element in contrast to a thrust of said elastic element, wherein said gripping element abuts said abutment wall.

2. The weighing system according to claim 1, wherein said elastic element is configured in such a way that a displacement of said gripping element between said measuring position and said end-stroke position does not cause a displacement of said loading stem of said weighing cell.

3. The weighing system according to claim 1, wherein said gripping element comprises an abutment end opposite to said housing and facing said abutment wall so as to abut said abutment wall.

4. The weighing system according to claim 1, wherein said gripping element comprises a connecting cavity opposite to said housing and arranged to receive a coupling portion of said connecting element, said elastic element means being interposed between said coupling portion and a bottom wall of said connecting cavity.

5. The weighing system according to claim 4, wherein said gripping element is connected to said connecting element through a fixing element, which further supports said elastic element.

6. The weighing system according to claim 5, wherein said fixing element passes through said elastic element.

7. The weighing system according to claim 1, comprising transfer assembly for transferring a capsule or a body to/from said at least one gripping element, the housing thereof being configured to receive and retain by force or interference coupling the capsule or body to be weighed.

8. The weighing system according to claim 7, wherein said transfer assembly is movable along an insertion/extraction direction and comprises a first transfer element arranged to insert said capsule or body in said housing so as to allow said weighing cell to measure the weight of said capsule or body, and a second transfer element suitable to remove said capsule or body from said housing, after the weight of said capsule or body has been measured.

9. The weighing system according to claim 8, wherein said first transfer element and said second transfer element are movable along said insertion/extraction direction among a first operating position, wherein said first and second transfer elements are more spaced from said loading stem, a second operating position, wherein said first and second transfer elements are closer to said loading stem so that said capsule or body is inserted inside said housing of the gripping element, and a third operating position, wherein said first and second transfer elements are spaced from said loading stem in an intermediate position between said first operating position and said second operating position, not in contact with said capsule or body that is housed and retained by force or interference coupling in said housing, so as to allow said weighing cell to measure the weight of said capsule or body.

10. The weighing system according to claim 9, wherein in said second operating position of said transfer elements said gripping element is pushed by said first transfer element by means of said capsule or body in said end-stroke position, wherein said gripping element abuts said abutment wall.

11. The weighing system according to claim 9, wherein in said third operating position of said first and second transfer elements, said gripping element is moved in said measuring position by said elastic element so as to be spaced from said abutment wall and completely supported by said loading stem in order to allow weighing the capsule or the body that is inserted in said housing.

12. The weighing system according to claims 8, wherein said gripping element has at least one lateral opening, to enable said second transfer element to slide inside said housing and along said insertion/extraction direction.

13. The weighing system according to claim 1, wherein said housing extends longitudinally and converges starting from an inlet end thereof, configured for insertion and removal of said capsule or body, towards said weighing cell, a cross section of said housing gradually decreasing starting from said inlet end down to a size smaller than a cross dimension of said capsule or body, so as to receive and retain the capsule or body by force or interference coupling.

14. A filling machine for capsules comprising:
- a plurality of operating stations for performing operations on said capsules;
- a moving device provided with a plurality of supports with respective seats for housing and moving said capsules in sequence through said operating stations; and
- at least one weighing station for weighing capsules or bodies of said capsules and comprising a weighing system according to any preceding claim 1.

15. The filling machine according to claim 14, wherein the weighing unit of said weighing station with said gripping element is arranged above said moving device with said housing positioned above one of said seats.

* * * * *